US011435169B2

(12) United States Patent
Amidon et al.

(10) Patent No.: US 11,435,169 B2
(45) Date of Patent: Sep. 6, 2022

(54) BARRIER FOR ABSORBING VERY HIGH POWER BULLETS AND USES THEREOF

(71) Applicant: 360° Ballistics, LLC, Wake Forest, NC (US)

(72) Inventors: Clayton Dean Amidon, Zebulon, NC (US); Mark Alan Siver, Youngsville, NC (US)

(73) Assignee: 360° Ballistics, LLC, Wake Forest, NC (US)

( * ) Notice: Subject to any disclaimer, the term of this patent is extended or adjusted under 35 U.S.C. 154(b) by 0 days.

(21) Appl. No.: 16/989,529

(22) Filed: Aug. 10, 2020

(65) Prior Publication Data

US 2021/0010788 A1   Jan. 14, 2021

Related U.S. Application Data

(63) Continuation of application No. 15/583,545, filed on May 1, 2017, now Pat. No. 10,739,114, which is a continuation of application No. 13/449,420, filed on Apr. 18, 2012, now abandoned.

(60) Provisional application No. 61/476,491, filed on Apr. 18, 2011.

(51) Int. Cl.
*F41J 13/00* (2009.01)
*C04B 28/04* (2006.01)
*C04B 40/00* (2006.01)
*C04B 103/30* (2006.01)
*C04B 111/20* (2006.01)

(52) U.S. Cl.
CPC ............. *F41J 13/00* (2013.01); *C04B 28/04* (2013.01); *C04B 40/0039* (2013.01); *C04B 2103/304* (2013.01); *C04B 2111/2046* (2013.01); *C04B 2201/20* (2013.01)

(58) Field of Classification Search
CPC ...... F41J 13/00; C04B 40/0039; C04B 28/04; C04B 2201/20; C04B 2103/304; C04B 2111/2046; Y02W 30/96
See application file for complete search history.

(56) References Cited

U.S. PATENT DOCUMENTS

| | | |
|---|---|---|
| 4,046,582 A | 9/1977 | Kawamura et al. |
| 4,075,808 A | 2/1978 | Peariman |
| 4,249,948 A | 2/1981 | Okada et al. |
| 4,391,664 A | 7/1983 | Kramer |
| 4,488,910 A | 12/1984 | Nicholson et al. |
| 4,683,800 A | 8/1987 | Snedeker |
| 4,737,193 A | 4/1988 | Gutmann et al. |
| 4,979,425 A | 12/1990 | Sprague |
| 5,131,791 A | 7/1992 | Kitziller |
| 5,456,752 A | 10/1995 | Hogan |
| 5,976,656 A | 11/1999 | Giraud |
| 6,244,009 B1 | 6/2001 | Cerrato |
| 6,264,735 B1 * | 7/2001 | Bean ................. C04B 22/16 106/644 |
| 6,423,134 B1 | 7/2002 | Trottier et al. |
| 6,568,310 B2 | 5/2003 | Morgan |
| 6,582,511 B1 | 6/2003 | Velpari |
| 6,620,236 B2 * | 9/2003 | Huntsman ........... C04B 28/02 106/713 |
| 6,688,811 B2 | 2/2004 | Forrester |
| 6,758,020 B2 | 7/2004 | Cerrato |
| 6,758,897 B2 | 7/2004 | Rieder et al. |
| 6,782,673 B2 | 8/2004 | Azar |
| 6,972,100 B2 | 12/2005 | Minke et al. |
| 7,111,847 B2 | 9/2006 | Larson et al. |
| 7,243,921 B2 | 7/2007 | Larson et al. |
| 7,357,394 B2 | 4/2008 | Halverson |
| 7,562,613 B2 | 7/2009 | Ahmad |
| 7,628,104 B2 | 12/2009 | Warren et al. |
| 7,677,151 B2 | 3/2010 | Ahmad |
| 7,748,307 B2 | 7/2010 | Hallissy et al. |
| 7,849,780 B1 | 12/2010 | Hallissy et al. |
| 8,043,982 B2 | 10/2011 | Telander |
| 8,479,464 B2 | 7/2013 | Holzworth |
| 8,959,862 B1 | 2/2015 | Kreizinger |
| 9,021,761 B2 | 5/2015 | Riccobene et al. |
| 9,121,675 B1 | 9/2015 | Amidon et al. |
| 2007/0062143 A1 | 3/2007 | Noushad |
| 2008/0092471 A1 | 4/2008 | Ahmad |
| 2008/0275149 A1 | 11/2008 | Ladely et al. |
| 2009/0162626 A1 | 6/2009 | Konishi et al. |

(Continued)

OTHER PUBLICATIONS

"Manual on Contorl of Air Content in Concrete", David A. Whiting and Mohamad A. Nagi, Portland Cement Association (Year: 1998).*
www.graceconstruction.com, Grace Concrete Products Darafill Dry Controlled low strength material perfomance additive. (Year: 2007).*
Hudson, Kenneth L. et al., Final Report Demonstration of Shock-Absorbing Concrete (SACON) Bullet Trap Technology (Report No. ATC-8183), Aug. 1999, 219 pages, U.S. Army Environmental Center, Aberdeen Proving Ground, MD 21010-5401.

(Continued)

*Primary Examiner* — Jeffrey S Vanderveen

(74) *Attorney, Agent, or Firm* — NEO IP

(57) ABSTRACT

This disclosure is directed to an improved ballistic concrete barrier for stopping projectiles with a kinetic energy of between about 1.0 kJ (750 foot-pounds) and 20.3 kJ (15,000 foot-pounds) in between about 3 inches and 10 inches. In one embodiment, the ballistic concrete barrier comprises (a) about 1 part by mass Portland cement; (b) about 0.5 to 1.5 part by mass fine aggregate; (c) about 0.005 to 0.15 part by mass fiber; (d) about 0.005 to 0.05 part by mass calcium phosphate; (e) about 0.005 to 0.05 part by mass aluminum hydroxide; and (f) about 0.0005 to 0.05 part by mass air entrainment additive, such that the ballistic concrete barrier is capable of stopping a fifty caliber bullet in less than 10 inches from a point of entry into the barrier.

20 Claims, No Drawings

(56) References Cited

U.S. PATENT DOCUMENTS

| | | |
|---|---|---|
| 2009/0282969 A1 | 11/2009 | Ahmad |
| 2010/0083819 A1 | 4/2010 | Mann et al. |
| 2010/0229715 A1 | 9/2010 | Tonyan et al. |
| 2010/0230035 A1 | 9/2010 | Frank et al. |
| 2010/0326336 A1 | 12/2010 | Struthers et al. |
| 2011/0197789 A1 | 8/2011 | Novak et al. |
| 2014/0116235 A1 | 5/2014 | Berroth et al. |
| 2014/0150362 A1 | 6/2014 | Propst |
| 2015/0315798 A1 | 11/2015 | Propst |
| 2017/0234659 A1 | 8/2017 | Amidon et al. |

OTHER PUBLICATIONS

Technical Specification for Shock Absorbing Concrete (SACON. RTM.)—Shock Absorbing Concrete for Constructing Live-Fire Training Facilities, Document metadata bears creation date of Feb. 12, 2007, 25 pages, U.S. Army Corps of Engineers.

Whiting, David A., Manual on Control of Air Content in Concrete, 1998, 52 pages, Portland Cement Association, Skokie, Illinois, USA.

* cited by examiner

BARRIER FOR ABSORBING VERY HIGH POWER BULLETS AND USES THEREOF

CROSS REFERENCE TO RELATED APPLICATIONS

This application is related to and claims priority to the following US applications. This application is a continuation of U.S. application Ser. No. 15/583,545, filed May 1, 2017, which is a continuation of U.S. application Ser. No. 13/449,420, filed Apr. 18, 2012, which claims the benefit of U.S. Provisional Application No. 61/476,491, filed Apr. 18, 2011, each of which is hereby incorporated by reference in its entirety.

FIELD OF THE DISCLOSURE

This disclosure relates to an improved ballistic concrete barrier and methods of using the barrier for training with very high power weapons such as those that fire fifty caliber bullets. Training facilities need backstops or other components which can safely absorb very high power live ammunition.

BACKGROUND OF THE DISCLOSURE

Fifty Caliber Arms

The fifty caliber weapons as they are currently known were developed just prior to World War I and became well-known through the fifty caliber Browning Machine Gun (.50 BMG). These weapons fire fifty caliber bullets that weigh from 600-800 grains (40-50 g) and have a diameter of 0.51 inches (12.95 mm). The standard military issue ball is 665 grains. The typical muzzle velocity of 2800-3100 feet/sec (850-950 m/s). Because of the large mass of the bullet and high velocity, the kinetic energies are very high 12,000-15,000 foot-pounds (17-21 kJ). In contrast, a .30-06 bullet shot by hunting rifle or a standard issue weapon for soldiers during World War II has a muzzle energy of 2000-3000 foot-pounds (3-4 kJ). Thus, a fifty caliber bullet impacts a target with many times the kinetic energy of conventional small arms.

Historically, fifty caliber arms would be mounted on a vehicle or set up in a bunker for use as anti-aircraft weapon. However, since the 1980's portable versions of fifty caliber arms have become widely used by military snipers. Fifty caliber advantages include a high mass and kinetic energy making them resistant to wind drift. The high kinetic energy makes them particularly lethal. Thus, fifty caliber weapons may be used effectively by a sniper for a target more than a mile away. Examples of such portable weapons are the single shot A15 or the semi-automatic Barrett M82. In addition to military uses they are used by the coast guard and some police forces, e.g., New York City, because a single shot landed in an engine block effectively disables a vehicle or speedboat. Police forces also have used fifty caliber weapons because they will penetrate most commercial brick walls and cinder blocks.

Shock Absorbing Concrete (SACON®)

Training is essential for both the military and civilian police forces. However, designing adequate backstops for military training, police, or civilian target practice, has been difficult. There are many difficulties associated with preparing such backstops. For example, a material must be strong enough to stop bullets, yet also must not cause ricochets because of risk to a shooter or bystander and must minimize the creation of lead dust from bullets spalling or fragmenting on impact. Wood backstops are problematic because insect or vermin infestation may lead to degradation and breakdown. Chemical treatment of wood creates additional environmental hazards associated with biocides or other toxins. Earthen barriers are difficult to move and stage in different settings, such as different lighting conditions. Over time earthen barriers may erode or wash away. Historically, fiber reinforced foamed concrete provided some benefits for training structures as a material that (1) resisted breakdown, (2) stopped bullets, and (3) prevented ricochets.

Lead from bullets is another fundamental problem. Lead is a heavy metal neurotoxin that accumulates over time in soft tissues, blood and bone. Exposures to extremely low concentrations of lead have been documented to cause learning disabilities and other neurological damage. Thus, lead is hazard with a potential for long-term harm. Lead from bullets may enter the environment as either elemental lead dust generated from the impact of bullets with the backstop or lead salts which may leach from the backstop into water supplies.

To address many of these concerns, researchers at the U.S. Army Engineer Research and Development Center (ERDC) invented SACON®, a low-leaching, foamed concrete. SACON® is effective absorbing low power projectiles and eliminating ricochets. As currently formulated it is a fiber-reinforced concrete with high concentrations of calcium phosphate and aluminum hydroxide to prevent leaching of lead fragments. U.S. Pat. No. 6,264,735 (Bean et al., "the '735 patent") describes SACON® and the reduced lead-leaching from the SACON® blocks. U.S. Pat. No. 6,620,236 (Huntsman et al., "the '236 patent") describes an improvement of the '735 patent formulation that includes an aluminum hydroxide additive to reduce or eliminate the erosion of heavy metals such as lead from the foamed concrete. The contents of both the '735 and the '236 patents are hereby incorporated by reference in its entirety.

SACON® is prepared using an air compressor by adding a wet foam that contains a foaming agent and a foam stabilizing agent such as hydroxypropyl methyl cellulose. The wet foam is added to the concrete mixture to achieve the appropriate density required by the military specifications. SACON® has been widely used by the military on bases in the U.S. and abroad. It has been used by other government agencies, e.g., police forces or the Drug Enforcement Agency. It is effective in stopping bullets from conventional small arms such as rifles (0.22 caliber, M16 (5.56 mm)) or pistols (0.38 caliber, 0.45 caliber, 9 mm). The reported penetration depths range from 1 inch (25 mm) for a 0.38 caliber pistol to 2.55 inches (63 mm) for 5.56 mm (M16 rifle), see Hudson et al., Final Report Demonstration of Shock-Absorbing Concrete (SACON) Bullet Trap Technology, August 1999.

While SACON® barriers are effective for conventional low power arms, e.g., 9 mm or 5.56 mm, they are ineffective for very high power bullets such as fifty caliber bullets. Fifty caliber bullets have been reported to penetrate SACON® to a depth of 18 inches or more. Given that the SACON® barriers, are often approximately two feet thick and may receive impacts from either side of the barrier, 18 inches of penetration (to the trailing edge of the bullet) is too deep. The military has a long felt need for a barrier that would be effective for very high power weapons such as the fifty caliber so they can have more flexibility in the layout and design for their fifty caliber training exercises. Anecdotal reports from military bases indicate that stray bullets from fifty caliber weapons are occasionally found in the small caliber arms ranges, indicating that conventional backstops may not be 100% effective. Thus, there is a need for more reliable backstops for use with fifty caliber training exercises. In addition, trainers would like to be able to have live-fire exercises using fifty caliber weapons in combination with other small arms or grenades. An example of such a drill would be live-fire from a fifty-caliber weapon on a Humvee while soldiers use conventional arms to attack a mock enclave. The disclosure described herein addresses this long-felt need for improved barriers capable of stopping very high power bullets.

SUMMARY OF THE DISCLOSURE

In particular non-limiting embodiments, the present disclosure provides a method for training an operator with a very high power live ammunition in a facility. The facility comprises a bullet absorbing component comprising (a) about 1 part by mass Portland cement; (b) about 0.5 to 1.5 part by mass fine aggregate; (c) about 0.005 to 0.15 part by mass fiber; (d) about 0.005 to 0.05 part by mass calcium phosphate; (e) about 0.005 to 0.05 part by mass aluminum hydroxide; and (f) about 0.0005 to 0.05 part by mass air entrainment additive, such that the bullet absorbing component is capable of stopping a fifty caliber bullet in less than 10 inches from a point of entry into the structural component. In one non-limiting embodiment, the bullet absorbing component comprises (b) about 0.8 to 1.2 part by mass fine aggregate; (c) about 0.008 to 0.012 part by mass fiber; (d) about 0.008 to 0.012 part by mass calcium phosphate; (e) about 0.008 to 0.012 part by mass aluminum hydroxide; and (f) about 0.0008 to 0.002 part by mass air entrainment additive. In another non-limiting embodiment, the bullet absorbing component comprises (b) about 0.9 to 1.1 part by mass fine aggregate; (c) about 0.009 to 0.011 part by mass fiber; (d) about 0.009 to 0.011 part by mass calcium phosphate; (e) about 0.009 to 0.011 part by mass aluminum hydroxide; and (f) about 0.0009 to 0.0015 part by mass air entrainment additive.

The mixture comprising the Portland cement, the fine aggregate, the fiber; the calcium phosphate, the aluminum hydroxide, and the air entrainment additive may be mixed until the mixture has a density less than about 90.8 pounds per cubic foot.

The very high power live ammunition may be fifty caliber live ammunition having a muzzle energy of about 10,000 to 15,000 foot-pounds or about 13,000 to 14,500 foot-pounds. The very high power live ammunition has a mass of about 500 to 900 grains or about 600 to 700 grains.

In one non-limiting embodiment, the fiber may be a polyolefin fiber, which may or may not be fibrillated. In another embodiment the air entrainment additive is Dara-Fill® Dry. The bullet absorbing component may have air bubbles resulting from the air entrainment additive that are less than about 0.04 inches (1 mm) in diameter. Alternatively, the bullet absorbing component may have air bubbles resulting from the air entrainment additive that are greater than 0.0004 inches (10 μm) in diameter. In another non-limiting embodiment, the bullet absorbing component has air bubbles resulting from the air entrainment additive that are less than about 0.04 inches (1 mm) in diameter and greater than 0.0004 inches (10 μm) in diameter.

The training with the very high power live ammunition is also performed in the same session with training using a 0.22 caliber weapon, a 0.38 caliber weapon, a .40 caliber weapon, a 0.45 caliber weapon, a 5.56 mm weapon, a 6.8 mm weapon, a 7.62 mm weapon, or a 9 mm weapon. Alternatively, the training with the very high power live ammunition is also performed in the same facility with training using a 0.22 caliber weapon, a 0.38 caliber weapon, a .40 caliber weapon, a 0.45 caliber weapon, a 5.56 mm weapon, a 6.8 mm weapon, a 7.62 mm weapon, or a 9 mm weapon. In addition, the training with the very high power live ammunition is also performed with a training using a grenade or other fragmentation device.

The facility may be a training village, an assault house, a shoot house, a mock cave, or a 0.50 caliber live-fire practice range. The bullet absorbing component may be a backstop. Moreover, the bullet absorbing components may be made on site at the facility.

DETAILED DESCRIPTION

Definitions

The term "very high power" means bullets with a combination of muzzle velocity or mass such that the muzzle energy, $KE=\frac{1}{2}mv^2$, is 5,000 foot-pounds (7 kJ) or greater. In some embodiments, the muzzle energy is 10,000 foot-pounds (14 kJ) or greater. In other embodiments, the muzzle energy is between 10,000 foot-pounds (14 kJ) and 15,000 foot-pounds (18 kJ). Non-limiting examples of such bullets include:

647 gr (41.9 g) Speer with a velocity of 3,044 ft/s (928 m/s) and a muzzle energy of 13,144 ft-lb (17,821 J);

655 gr (42.4 g) ADI with a velocity of 3,029 ft/s, energy of 13,350 ft-lbf (18,100 J); or 800 gr (52 g) Barnes with a velocity of 2,820 ft/s and energy of 13,241 ft-lbs (17,952 J).

Very high power bullets include the military standard fifty caliber (0.50) bullet used in the Browning machine gun. The bullet would typically be lead, but is not limited to lead. Alternative, non-limiting embodiments include bullets with tracers; internal circuitry for drift correction; explosives; other metals; or metal alloys.

The term "fine aggregate" means natural sand (including quartz, chert, igneous rock and shell fragments), limestone (calcium carbonate), manufactured sand (crushed stone, recycled concrete, slag) ranging from mesh size #8 to #200 (2.4 mm to 0.07 mm). In preferred, non-limiting embodiments the fine aggregate is masonry sand (ASTM C 144) or general concrete sand (ASTM C 33) meeting the size criteria. In one non-limiting embodiment the fine aggregate is saturated surface dry (SSD) material, see ASTM C 128.

The term "fiber" means concrete additives to reinforce the concrete with may be steel, alkali-resistant glass strands, or synthetic polymers. In preferred, non-limiting embodiments the fiber is a polyolefin, a polyester, a polyamide, (e.g., Kevlar®, nylon, polyester, polyethylene, polypropylene) or a mixture thereof, which may be a monofilament, fibrillated, or structured fibers (macrofibers). In one embodiment, the fibers meet ASTM C 1116 standards, such as ASTM C 1116 Type III requirements for polypropylene or ASTM C 1116 Type I for steel. Non-limiting examples include Grace Fibers™ (W.R. Grace & Co., Cambridge, Mass.); Nylon-N6600, Polyester-PE7, Polypropylene-CFP1000, Polypropylene-PP7 (Concrete Fibers Inc., Dallas, Tex.); Nycon-MM, NYCON-PVA, Nycon-RECS100, Nycon-RF4000, Nycon-RSC15, Nycon-XL (Nycon Corp., Fairless Hills, Pa.); ENDURO® 600, Fibercast® 500 for Precast, Fibercast® 510, Fibermesh® 150, Fibermesh® 300, Fibermesh® 650, Novocon® 1050, Novocon® XR, Novomesh® 850, Novomesh® 950 (Propex Concrete Systems Corp., Chattanooga, Tenn.); PSI Fibers™ (PSI Packaging, LaFayette, Ga.). Additional examples of suitable fibers include fibers described in U.S. Pat. No. 5,456,752 (Hogan); U.S. Pat. No. 6,423,134 (Trottier et al.); U.S. Pat. No. 6,582,511 (Velpari); or U.S. Pat. No. 6,758,897 (Rieder et al.), the contents of which are hereby incorporated by reference in their entirety.

The term "air entrainment additive" means admixtures that are part of the concrete mix to incorporate air bubbles of controlled sizes in the concrete matrix. These admixtures stabilize the air bubbles entrained during the mechanical mixing of concrete by the mixer blades. Examples of air entrainment additives include, but are not limited to, DaraFill® Dry or wet DaraFill formulations (W.R. Grace & Co.), Rheocell® Rheofill™ (BASF Construction Chemicals, Cleveland, Ohio), Micro Air® (BASF Construction Chemicals), EUCON EASY FILL (Euclid Chemical Co., Cleveland, Ohio), Fritz-Pak Fill Flow (Fritz-Pak, Dallas, Tex.). Additional examples of air entrainment additives may be found in U.S. Pat. No. 4,488,910 (Nicholson et al.); U.S. Pat. No. 4,737,193 (Gutmann et al.); U.S. Pat. No. 4,249,948 (Okada et al.); U.S. Pat. No. 4,046,582 (Kawamura et al.); or the Portland Cement Association publication entitled "Manual on Control of Air Content in Concrete" (PCA EB116), the contents of which are hereby incorporated by reference in their entirety.

The term "depth of penetration" with respect to a bullet penetration into a barrier is measured by inserting a measuring implement into the hole formed by the bullet and measuring from the point of entry to the trailing end of the bullet. Thus, the maximum penetration is actually a bit deeper than the measured penetration as the bullet, while altered in shape from the impact has a non-zero length. The depth of penetration of bullets into the absorbing material may be measured using alternative methods known to those skilled in the art. Laser based tools such as a laser range finder may also be used.

Preparations of Bullet Absorbing Components

In a non-limiting formulation, the bullet absorbing components are prepared by mixing cement, fine aggregate, and water to form a grout. The grout may be obtained from a ready mix concrete supplier.

Next an air entrainment additive is mixed into the grout. Then calcium phosphate, aluminum hydroxide and fiber are added. After mixing for a number of minutes the density is checked.

If the mixture is above the optimal density, additional mixing adds additional entrained air bubbles to reduce the density. The process of measuring density and providing additional mixing is repeated until the measured density is within a target range of the optimal density.

When the density is deemed appropriate, the concrete is poured into molds to form the component. Typically, the concrete is allowed to harden and cure for at least 4 weeks. Batching, mixing, transporting, testing, curing and placing the concrete would preferably meet the standards described in the Army Corp. of Engineers guidelines "Technical Specification for Shock Absorbing Concrete (SACON®)":

American Concrete Institute (ACI) Standards

ACI 117 (1990) Standard Specifications for Tolerances for Concrete Construction and Materials
ACI 301 (1999) Standard Specification for Structural Concrete
ACI 304R (2000) Guide for Measuring, Mixing, Transporting, and Placing Concrete
ACI 305R (1999) Hot Weather Concreting
ACI 306R (1997) Cold Weather Concreting
ACI 544.1R (1996) State-of-the-Art Report in Fiber Reinforced Concrete
ACI 544.2R (1999) Measurement of Properties of Fiber Reinforced Concrete American Society for Testing and Materials ASTM C 33 (2001) Standard Specification for Concrete Aggregate
ASTM C 39 (2001) Standard Test Method for Compressive Strength of Cylindrical Concrete Specimens
ASTM C 94 (2000) Standard Specifications for Ready-Mixed Concrete
ASTM C 138 (2001) Standard Test Method for Density (Unit Weight), Yield, and Air Content (Gravimetric) of Concrete
ASTM C 144 (2002) Standard Specification for Aggregate for Masonry Mortar
ASTM C 150 (2002) Standard Specification for Portland Cement
ASTM C 171 (1997) Standard Specification for Sheet Materials for Curing Concrete
ASTM C 172 (1999) Standard Practice for Sampling Freshly Mixed Concrete
ASTM C 567 (2000) Standard Test Method for Unit Weight of Structural Lightweight Concrete
ASTM C 1116 (2002) Standard Specification for Fiber-reinforced Concrete and Shotcrete Us Army Corps of Engineers Handbook for Concrete and Cement (CRD)

CRD-C 400 (1963) Requirements for Water for Use in Mixing or Curing Concrete

National Ready-Mixed Concrete Association (NRMCA)

NRMCA QC 3 (January 1990; 9th Rev) Quality Control Manual: Section 3, Plant Certifications
Checklist: Certification of Ready-Mixed Concrete Production Facilities
NRMCA CPMB 100 (January 1990; 9th Rev) Concrete Plant Standards
NRMCA TMMB 1 (1989; 13th Rev) Truck Mixer and Agitator Standards The Portland cement used would preferably be ASTM C 150 Type 1-II. The fine aggregate may be masonry sand (ASTM C 144), or general concrete sand (ASTM C 33).

The calcium phosphate may be granulated bone meal, bone ash, or precipitated calcium phosphate. In one non-limiting embodiment, it is technical grade or higher. The aluminum phosphate may be metakaolinite or precipitated aluminum hydroxide. In one non-limiting embodiment, it is technical grade or higher. Color pigments may be optionally added to create the appearance rocks, trees, buildings, etc. Suppliers of concrete pigments include Scofield Co. (Douglasville, Ga.) or Lambert Corp. (Orlando, Fla.). Thus, the present disclosure teaches the option of pigmented bullet absorbing components.

The present disclosure teaches the creation of components made from wet concrete prepared without an addition of preformed foam.

One of skill in the art of concrete manufacturing would recognize that these materials are prepared on industrial scale and accordingly quantities and proportions may vary in accordance with industry norms. In addition, one skilled in concrete manufacturing would recognize that materials may be measured by volume or by timed delivery from a storage container.

The following Examples further illustrate the various teachings of the disclosure and are not intended to limit the scope of the claimed invention.

EXAMPLES

Preparation of Components Capable of Absorbing Very High Power Bullets

The ingredients for making the very high power bullet absorbing components are as follows:

| Ingredient | Cubic Meter | Cubic Yard |
|---|---|---|
| Portland Cement | 577 kg (1272 lbs) | 972 lbs (441 kg) |
| Fine Aggregate (SSD) | 577 kg (1272 lbs) | 972 lbs (441 kg) |
| Water | 277 kg (611 lbs) | 466 lbs (211 kg) |
| Calcium Phosphate | 5.78 kg (12.7 lbs) | 9.72 lbs (4.4 kg) |
| Aluminum Hydroxide | 5.78 kg (12.7 lbs) | 9.72 lbs (4.4 kg) |
| DaraFill® Dry | 423.36 g (14.93 oz) | 11.4 oz (323.16 g) |
| Grace Fibers™ | 8.8 kg (19.4 lbs) | 14.8 lbs (6.7 kg) |

The process for making very high power bullet absorbing components is as follows:

Create or obtain a grout of Portland cement, fine aggregate, and water in a mixer in accordance with ACI standard 304R and/or ASTM standard C 94.

Add a chemical air entrainment additive (DaraFill® Dry, W. R. Grace & Co.), and mix thoroughly into the grout. Following the addition of the additive, mix the product for five minutes. Mixing may be achieved by rotating the drum on a cement mixer truck.

Add Calcium Phosphate, Aluminum Hydroxide and Grace Fibers™. Mix for ten minutes.

Note that in testing for the product, adding the fiber was necessary to achieve the required densities. Check density by weighing using a ¼ cubic foot testing pot. Target weight is 22.7 lbs (90.8 lbs per cubic foot). Additional mixing lowers the density. Continue to mix, checking frequently, until target density is achieved. Pour material into molds.

After filling the molds, the material may be optionally tapped down with a rod to eliminate voids around embedments in the casting forms. Not all components will be poured into molds with embedments. Molds without embedments may not need a rod to eliminate any voids, but a form with an embedment such as a window cutout may need a treatment with a rod to eliminate voids.

The target wet density material when poured into components is 1458 kg/m$^3$ (91-pcf±0.3 pcf).

While traditionally, SACON components have been left in the molds for fourteen days, an alternative process is to remove the sides of the forms within 24 hours and remove the bottom of the form after at least three days. The component is wrapped in plastic to assure adequate hydration during curing. One of skill in the art will recognize that the timing of these steps may be adjusted based on weather conditions, particularly temperature but also factoring humidity. The components are allowed to harden and dry and are ready for use and/or testing after 28 days.

One of skill in the art will recognize that the fibers enhance the strength and resilience of the components and ability of the molded components to withstand a bullet entry without spalling. Spalls are flakes of material that are broken off a larger solid body such as the result of projectile impact, weathering, or other causes. It is desired that the molded components retain their structural integrity with the exception of the trail formed by the bullet entry. Thus while the fibers are important, one of skill in the art can identify and substitute other fibers that are suitable for the task, see e.g., Paragraph 0017 above. The choice of fibers will impact the overall density of the wet material as the weight of the fibers impact the density calculation.

Traditional SACON®

Traditional SACON® is prepared following ERDC specifications,

ERDC Specifications require the following ingredients:

| Ingredient | Cubic Meter | Cubic Yard |
|---|---|---|
| Portland Cement | 577 kg (1272 lbs) | 972 lbs (441 kg) |
| Fine Aggregate (SSD) | 577 kg (1272 lbs) | 972 lbs (441 kg) |
| Water | 277 kg (611 lbs) | 466 lbs (211 kg) |
| Calcium Phosphate | 5.78 kg (12.7 lbs) | 9.72 lbs (4.4 kg) |
| Aluminum Hydroxide | 5.78 kg (12.7 lbs) | 9.72 lbs (4.4 kg) |
| Foam Stabilizer | 0.15 kg (0.33 lb) | 0.25 lbs (0.11 kg) |
| Foam (Void System) | 0.33 m$^3$ (11.7 cu ft) | 9.0 cu ft (0.25 m$^3$) |
| Fiber (choice of) | | |
| Polypropylene | 8.8 kg (19.4 lbs) | 14.8 lbs (6.7 kg) |
| Steel | 115 kg (254 lbs) | 193 lbs (88 kg) |

ERDC requires the use of a foaming agent and foam stabilizing agents. Specifically they require:

Section 2.4.1 Foaming Agents: Foaming agent shall comply with ASTM C 869, tested in accordance with ASTM 796; and Section 2.4.2 Foam Stabilizing Agents: The stabilizing agent shall contain hydroxypropyl methylcellulose powder limited to 19.0 to 24.0% methoxyl and 7.0 to 12.0% hydroxypropoxyl, similar to Dow Chemical Co. K100M.

Traditional SACON® uses an air compressor and water to generate pre-formed foam.

Traditional SACON® specifications require meeting the following density standards:

Density
(Without fibers) 1442 kg/m$^3$ (90-pcf)
(With polypropylene fibers) 1458 kg/m$^3$ (91-pcf)
(With steel fibers) 1554 kg/m$^3$ (97-pcf)

The foam is added to the mix, as follows using the ERDC specifications. The void material, pre-formed foam shall be added to the cement slurry to obtain the required density. The material shall be added in increments to reduce the possibility of exceeding the SACON® density tolerances. The recommended procedure is to add the foam in half increments, i.e., add half of the foam initially by time of insertion and calculate the density. If the density remains above the upper tolerance, add half of the remaining foam and re-calculate the density. If the density continues to remain above the upper tolerance, then add half of remaining foam until the density tolerance of +48 kg/m$^3$ (3-pcf) relative to the target density (based on fiber use) has been achieved.

Benefits of the Improved Bullet Absorbing Components

The improved components, prepared as described above, can stop a fifty caliber bullet in 4-8 inches based on probes inserted into the bullet holes. The Army Corps of Engineers has reported that they have not been able to stop a fifty caliber bullet in less than 18 inches of traditional SACON®. A 5.56 mm (M855) bullet weighs 62 grains, travels at 2300 ft/sec, and has a muzzle energy of 750 foot-pounds (1.0 kJ). The average stopping distance for a 5.56 mm fired from an M16 into the improved bullet absorbing component is 3.48 inches (88.4 mm). A fifty caliber bullet weighs 660 grains, travels at 3100 ft/sec, and has a muzzle energy of 14,000 foot-pounds (13.8 kJ). Thus, a fifty caliber bullet has nearly fourteen times the kinetic energy of a 5.56 mm bullet, yet the improved components can stop both types of bullets within a relatively similar stopping distance.

Traditional SACON® is capable of stopping the 5.56 mm, but cannot stop the fifty caliber bullet in an acceptable stopping distance. The improved stopping power opens the possibility of construction of multi-use ranges with the improved components. SACON® is traditionally installed in modular panels that are typically 24" to 30" thick. Panels may be considered compromised when they have been penetrated by greater than 50% of the thickness of the panel, both because of the danger of collapse of the panel and because of the danger of shoot through if the panel is hit at the same point a second time. A traditional SACON® panel will be quickly compromised and unusable even at a thickness of 36" when a fifty caliber round is used because the round can penetrate 18 inches or more. The improved material alleviates this problem.

To date, the improved bullet absorbing components have consistently performed well in ballistic testing. Anecdotal evidence suggests significantly higher failure rates for traditional SACON® than with the improved production process. These failure rates may be due to a lack of consistency of the product using traditional SACON®. The improved production process produces a very consistent material with an extremely low (less than 1%) failure rate.

It is to be understood that, while the teachings of the disclosure have been described in conjunction with the detailed description, thereof, the foregoing description is intended to illustrate and not limit the scope of the claimed invention. Other aspects, advantages, and modifications of the teachings of the disclosure are within the scope of the claims set forth below. All publications, patents, and patent applications cited in this specification are herein incorporated by reference as if each individual publication or patent application was specifically and individually indicated to be incorporated by reference.

One of skill in the art will recognize that some of the alternative implementations set forth above are not universally mutually exclusive and that in some cases additional implementations can be created that employ aspects of two or more of the variations described above. The legal limitations of the scope of the claimed invention are set forth in the claims that follow and extend to cover their legal equivalents. Those unfamiliar with the legal tests for equivalency should consult a person registered to practice before the patent authority which granted this patent such as the United States Patent and Trademark Office or its counterpart.

The invention claimed is:

1. A bullet-absorbing concrete structure constructed with a concrete mixture comprising:
    (i) about 1 part by mass cement;
    (ii) about 0.5 to 1.5 part by mass fine aggregate;
    (iii) about 0.005 to 0.15 part by mass fiber; and
    (iv) air entrainment additive;
    wherein the concrete structure is capable of stopping a fifty-caliber bullet in less than about 8 inches from a point of entry into the concrete structure; and
    wherein the concrete structure is constructed without preformed foam.

2. The concrete structure of claim 1, wherein the concrete structure is constructed with a concrete mixture comprising:
    (i) about 1 part by mass cement;
    (ii) about 0.8 to 1.2 part by mass fine aggregate;
    (iii) about 0.008 to 0.012 part by mass fiber; and
    (iv) about 0.0005 to 0.05 part by mass air entrainment additive;
    the concrete mixture having been poured at a density of between about 88 and about 90.8 pounds per cubic foot.

3. The concrete structure of claim 1, wherein the concrete mixture further includes a lead leaching preventative.

4. The concrete structure of claim 3, wherein the lead leaching preventative comprises calcium phosphate and aluminum hydroxide, and wherein the concrete mixture comprises about 0.005 to 0.015 part by mass calcium phosphate and about 0.005 to 0.015 part by mass aluminum hydroxide.

5. The concrete structure of claim 1, wherein the concrete mixture further includes calcium phosphate and aluminum phosphate, wherein the calcium phosphate is comprised of granulated bone meal, bone ash, or precipitated calcium phosphate, and wherein the aluminum phosphate is comprised of metakaolinite or precipitated aluminum phosphate.

6. The concrete structure of claim 1, wherein the air entrainment additive includes a mixture of a fatty alkanolamide, diethanolamine, perlite, and quartz dust.

7. The concrete structure of claim 1, wherein the concrete mixture further includes air bubbles resulting from the air entrainment additive that are less than about 0.04 inches in diameter and greater than about 0.003 inches in diameter.

8. The concrete structure of claim 1, wherein the concrete mixture further includes air bubbles resulting from the air entrainment additive that are less than about 0.001 inches in diameter and greater than about 0.0004 inches in diameter.

9. The concrete structure of claim 1, wherein the fine aggregate comprises masonry sand or general concrete sand.

10. The concrete structure of claim 1, wherein the concrete mixture absorbs and stops a projectile with a kinetic energy of between about 1.0 kJ (750 foot-pounds) and 20.3 kJ (15,000 foot-pounds) in less than about 6 inches.

11. The concrete structure of claim 1, wherein the concrete mixture was poured at a density of about 90.8 pounds per cubic foot.

12. The concrete structure of claim 1, wherein the concrete mixture comprises: (i) about 0.9 to 1.1 part by mass, fine aggregate; (ii) about 0.009 to 0.011 part by mass, fiber; and (iii) about 0.0009 to 0.0015 part by mass, air entrainment additive.

13. A bullet-absorbing concrete structure constructed with a concrete mixture comprising:
    (i) cement;
    (ii) fine aggregate; and
    (iii) dry air entrainment additive;
    the concrete mixture having been poured at a density of between about 88 and about 90.8 pounds per cubic foot; and
    wherein the concrete structure is constructed without preformed foam.

14. The concrete structure of claim 13, further including fiber.

15. The concrete structure of claim 14, wherein the concrete mixture absorbs and stops a projectile with a kinetic energy of between about 1.0 kJ (750 foot-pounds) and 20.3 kJ (15,000 foot-pounds) in less than about 8 inches.

16. The concrete structure of claim 13, wherein the concrete mixture further includes a lead leaching preventative.

17. The concrete structure of claim 13, wherein the concrete mixture was poured at a density of about 90.8 pounds per cubic foot.

18. The concrete structure of claim 13, wherein the concrete mixture further includes air bubbles resulting from the dry air entrainment additive that are less than about 0.04 inches in diameter and greater than about 0.003 inches in diameter.

19. The concrete structure of claim 13, wherein the concrete mixture further includes air bubbles resulting from the dry air entrainment additive that are less than about 0.001 inches in diameter and greater than about 0.0004 inches in diameter.

20. A bullet-absorbing concrete structure constructed with a concrete mixture comprising:
    (i) about 1 part by mass cement;
    (ii) about 0.5 to 1.5 part by mass fine aggregate;
    (iii) about 0.005 to 0.15 part by mass fiber; and
    (iv) air entrainment additive;
    wherein the concrete structure is constructed without preformed foam.

* * * * *